US008458125B1

(12) United States Patent
Chong, Jr. et al.

(10) Patent No.: US 8,458,125 B1
(45) Date of Patent: Jun. 4, 2013

(54) DYNAMIC CREATION OF REPLICAS OF STREAMING DATA FROM A STORAGE DEVICE WITHOUT ADDED LOAD

(75) Inventors: Fay Chong, Jr., Cupertino, CA (US); Whay S. Lee, Milpitas, CA (US)

(73) Assignee: Oracle America, Inc., Redwood City, CA (US)

( * ) Notice: Subject to any disclaimer, the term of this patent is extended or adjusted under 35 U.S.C. 154(b) by 2321 days.

(21) Appl. No.: 11/046,917

(22) Filed: Jan. 31, 2005

(51) Int. Cl.
*G06F 17/30* (2006.01)

(52) U.S. Cl.
USPC ............................ 707/610; 707/626; 707/634

(58) Field of Classification Search
USPC ......................................... 707/610, 626, 634
See application file for complete search history.

(56) References Cited

U.S. PATENT DOCUMENTS

| | | | | |
|---|---|---|---|---|
| 5,519,862 | A * | 5/1996 | Schaeffer et al. | 717/165 |
| 5,933,825 | A * | 8/1999 | McClaughry et al. | 1/1 |
| 6,138,118 | A * | 10/2000 | Koppstein et al. | 1/1 |
| 6,266,753 | B1 | 7/2001 | Hiock et al. | |
| 6,324,580 | B1 * | 11/2001 | Jindal et al. | 709/228 |
| 6,401,121 | B1 * | 6/2002 | Yoshida et al. | 709/227 |
| 6,404,975 | B1 * | 6/2002 | Bopardikar et al. | 386/46 |
| 6,463,454 | B1 * | 10/2002 | Lumelsky et al. | 718/105 |
| 6,671,701 | B1 * | 12/2003 | Chouinard | 1/1 |
| 6,789,123 | B2 | 9/2004 | Li et al. | |
| 6,826,778 | B2 * | 11/2004 | Bopardikar et al. | 725/145 |
| 7,251,708 | B1 * | 7/2007 | Justiss et al. | 711/111 |
| 7,822,711 | B1 * | 10/2010 | Ranade | 707/622 |
| 2001/0047400 | A1 * | 11/2001 | Coates et al. | 709/219 |
| 2002/0091722 | A1 | 7/2002 | Gupta et al. | |
| 2002/0129048 | A1 | 9/2002 | Qiu et al. | |
| 2003/0061362 | A1 | 3/2003 | Qiu et al. | |
| 2003/0078964 | A1 | 4/2003 | Parrella, Sr. et al. | |
| 2004/0205152 | A1 * | 10/2004 | Yasuda et al. | 709/217 |
| 2004/0225744 | A1 | 11/2004 | Frossard et al. | |
| 2005/0005025 | A1 | 1/2005 | Harville et al. | |

* cited by examiner

*Primary Examiner* — Hanh Thai
(74) *Attorney, Agent, or Firm* — Marsh Fischmann & Breyfogle, LLP; Kent A. Lembke

(57) ABSTRACT

A method, and corresponding system, is provided for generating replicas or copies of data objects that are used to serve data streams. The method includes determining one of the storage devices is operating at a load above a predetermined overload value. The method continues with identifying the data objects being served by data streams from the near overload storage device and then, selecting one of these served data objects for replication. To create a replica, the method includes writing data from the selected data object to another less busy one of the data storage devices, with the writing being done using data from one or more of the streams being served from the selected data object on the near-overload storage device. During replica creation, one or more streams from the selected data object provide data concurrently to a stream consumer or client device and to the replica.

17 Claims, 6 Drawing Sheets

DYNAMIC CREATION OF REPLICAS OF STREAMING DATA FROM A STORAGE DEVICE WITHOUT ADDED LOAD

BACKGROUND OF THE INVENTION

1. Field of the Invention

The present invention relates, in general, to storage systems such as those optimized for delivering streaming data (e.g., a video image storage depository) and to copying and storing data within data storage systems, and, more particularly, to a method for creating replicas within a media storage system without introducing additional load, e.g., without introducing additional READ streams from the storage system or device as is the case with conventional COPY commands or explicit COPY operation.

2. Relevant Background

The computer industry has seen a huge growth in the use of streaming data or streaming media to deliver content to users and customers connected to a network, such as the Internet or a local or wide area network. For example, audio and video media is delivered in a "stream" from a server so that the end user does not have to wait several minutes or longer to download multimedia files. Files are transmitted over IP networks and then viewed on-the-fly as received by the client computer or network device. It has become very common for live or pre-recorded audio/video content to be encoded (digitized and compressed) and then transmitted sequentially over the Internet or an intranet as packets of information. Data is received and decompressed by the end-user using a player on their network device or client computer that may be integrated into the browser or provided as a separate application. With the development of streaming technologies, people can simply connect to a network, select an audio or video object, and then listen or view the media or data as it streams to their network or computer device.

With this large demand for streaming data or media, a number of problems have developed that can cause problems with delivering the requested data in a timely manner or without interruption (e.g., at a smooth delivery rate required for a quality viewing or listening experience). For example, streaming media storages systems or depositories may be created to support delivery of requested streaming data or data objects. However, during operation of such a streaming media storage system, additional replicas of data objects often have to be created dynamically to meet fluctuations or increases in the demand for concurrent access to the data objects (e.g., peaks in demands for a particular song or movie data object). Conventional methods of simply copying the data object present in a storage device is not satisfactory because it creates additional burdens on the already overloaded source storage device as the copying makes it more difficult to access the data object and increases demand for concurrent access.

To better understand problems associated with effectively managing the storage and delivery of streaming media, it may be useful to look at that streaming data and problems associated with its delivery. Streaming data typically refers to data objects that are large in size, e.g., many megabytes to many gigabytes or larger in size and that are accessed in a continuously streaming fashion, i.e., the bytes making up the data object are accessed and transmitted to an end user in order of their logical location within the data object. Common examples of streaming data, as discussed above, are digital video files and digital audio files, which are typically static files (i.e., read-only content) such as a pre-recorded movie or music program or song. To provide a pleasing viewing and/or listening experience, the data needs to be presented to the user's device (and to the human user) in a smoothly streaming manner. From the perspective of the data storage system serving the data (e.g., the media depository), this requirement indicates the need to supply the data stream from one of its storage devices (e.g. the source data storage device) to the user's device (e.g., a video terminal or the like) at a guaranteed, predetermined minimum rate, such as at a rate that is more than a set amount of bits per second.

Maintaining high access to a wide range of data objects while maintaining the predetermined minimum access or streaming rate is difficult. In this regard, a data storage system servicing streaming media or data may include a number of storage devices each of which is capable of supplying a certain number of data streams concurrently while meeting the rate guarantees or desired streaming rate. As a result, the number of concurrent streams, e.g., read output streams, that a data storage system can support for a given data object, such as popular movie or song, is dependent on the number of streams each device in the system can support and on the number of the devices in the system that include a copy of the given data object. This number of concurrent streams may also be reduced by serving other data streams for other data objects (e.g., movies or songs). In general, the larger the number of devices that hold a copy of a data object the more concurrent streams of that object that can be served by the data storage system.

However, because each additional copy or replica of the data object consumes additional and limited capacity of the system, it is generally desirable to maintain just enough copies or replicas of the data object located on just enough storage devices to provide the number of concurrent streams to meet existing user demand. For example, a system manager may decide to have copies of a popular or high demand movie kept on several storage devices while only keeping one copy or fewer copies of a not as popular or low demand movie in order to avoid wasting storage capacity in the system. However, user demand for a data object fluctuates, and sometimes largely, over time, and the number of concurrent streams needed often will change.

To optimize performance and capacity usage, one management approach is to change the number of copies of the data object with current or predicted demand, e.g., if demand is rising more copies are made and when demand subsides copies are deleted. For example, a system may be configured such that when the system detects that a particular storage device is becoming overloaded with too many concurrent streams being served for a particular data object (e.g., movie or song or other data object) the system acts to create a replica of the data object in a less busy or idle storage device. A common and straight forward approach to creating a replica of a data object is to have a system or data storage management application issue a command to copy (i.e., a COPY command) the data object to an idle or less busy device in the system. This conventional replication technique is problematic, however, because performing the COPY command results in yet another stream from the already busy device to retrieve the data object to be written to the other storage device. To address this problem, some data storage systems have attempted to better predict upcoming demand so as to avoid overloading the storage device by initiating the COPY operations long before the storage device has reached its capacity. This technique also has its problems as many times the prediction of increased demand is wrong and a COPY operation is performed when the copy or replica is never actually used or needed (i.e., the original storage device does not reach its capacity), which results in wasting storage space and using system bandwidth that could be used for other more useful operations.

Hence, there remains a need for an improved method and system for creating replicas or copies of data objects or streaming data in a data storage system that is serving multiple, concurrent streams of data. Such a method and system preferably would not create an additional load on storage devices storing the object being replicated (i.e., the source device).

SUMMARY OF THE INVENTION

The present invention addresses the above and other problems by providing a streaming data storage and serving system (and corresponding method) that is configured to create replicas of data objects without generating additional load or concurrent READ streams on a storage device containing the replicated data objects. Briefly, instead of starting an explicit COPY operation, the system of the present invention operates to select one or more existing or new streams for a data object to be copied. Then, the system acts to send the data stream(s) to be written to another storage device in the system, e.g., a device identified as idle or at least acceptably less busy, while continuing to deliver the stream(s) to the requesting or user device. The underlying method of the invention can be thought of as a "COPY-ON-READ" (COR) approach to replicating data objects in a data storage system serving streaming media.

As will become clear in the following detailed description, the system and method of the present invention provide a number of advantages over convention COPY command approaches. The COPY-ON-READ approach generates a replica dynamically to increase the bandwidth available for serving up a popular data object without wasting storage capacity with holding extra copies before they are actually needed or demanded. The replica is constructed using data that is tapped off or taken from existing or presently served streams rather than requiring an additional stream from the already overloaded source storage device as is the case with the COPY command. This allows the COPY-ON-READ operation to be initiated when the source device is at or close to full capacity, which in some cases will result in the inventive system not creating a replica where one would have been created in prior systems operating with the convention COPY command. The system performing the COPY-ON-READ operation will typically have higher effective bandwidth when compared with systems using the simple COPY command, and this often will yield a shorter replica construction time.

More particularly, a method is provided for generating replicas or copies of data objects that are being used to serve data streams from a data storage system which includes a plurality of storage devices. The method includes determining that one of the storage devices is operating at a load that is above a predetermined overload value (such as above 90 percent or the like based on number of streams being served compared with stream capacity). The storage devices in the system are typically operating to stored data objects that are serving data streams (such as audio and/or video streams) to client devices. The method continues with identifying the data objects being served by the data streams from the near overload storage device and then, selecting one of these served data objects for replication.

To create a replica, the method includes initiating writing data from the selected data object to another one of the data storage devices, with the writing being done using data from one or more of the streams being served from the selected data object on the near-overload storage device. In this manner, one or more streams from the selected data object provide data concurrently to a stream consumer or client device and to the replica. The streams selected for writing the replica are typically selected such that their read addresses are relatively well distributed across valid addresses of the selected data object (i.e., are not within a predefined distribution value such as not within a fixed percent or set address value) to enhance write efficiency. The method may further include receiving a request for a new stream for the selected data object and responding by serving the new stream from the replica concurrently with the writing of data from the selected data object (i.e., before completion of the replica).

DETAILED DESCRIPTION OF THE PREFERRED EMBODIMENTS

The invention is generally directed to systems and methods for creating replicas or copies of data objects used to provide one or more streams to stream consumers, such as users or operators of client devices linked to a network such as the Internet. The systems and methods of the present invention differ from conventional methods that simply initiated a COPY command because the inventive systems and methods utilize a COPY-ON-READ approach combined with effective stream migration control to avoid placing additional load on a source storage device that contains the data object to be copied. Briefly, the COPY-ON-READ approach involves identifying a data object to be replicated and then, writing with or tapping off the stream or, more preferably, streams from the identified object (herein "COR candidate") to create a replica. The COPY-ON-READ approach also includes additional steps or processes required to manage incoming requests for additional streams (or access to streaming data), stream migration among data storage devices, and carefully selecting streams for use in replication and monitoring of replica generation.

Figure 1:
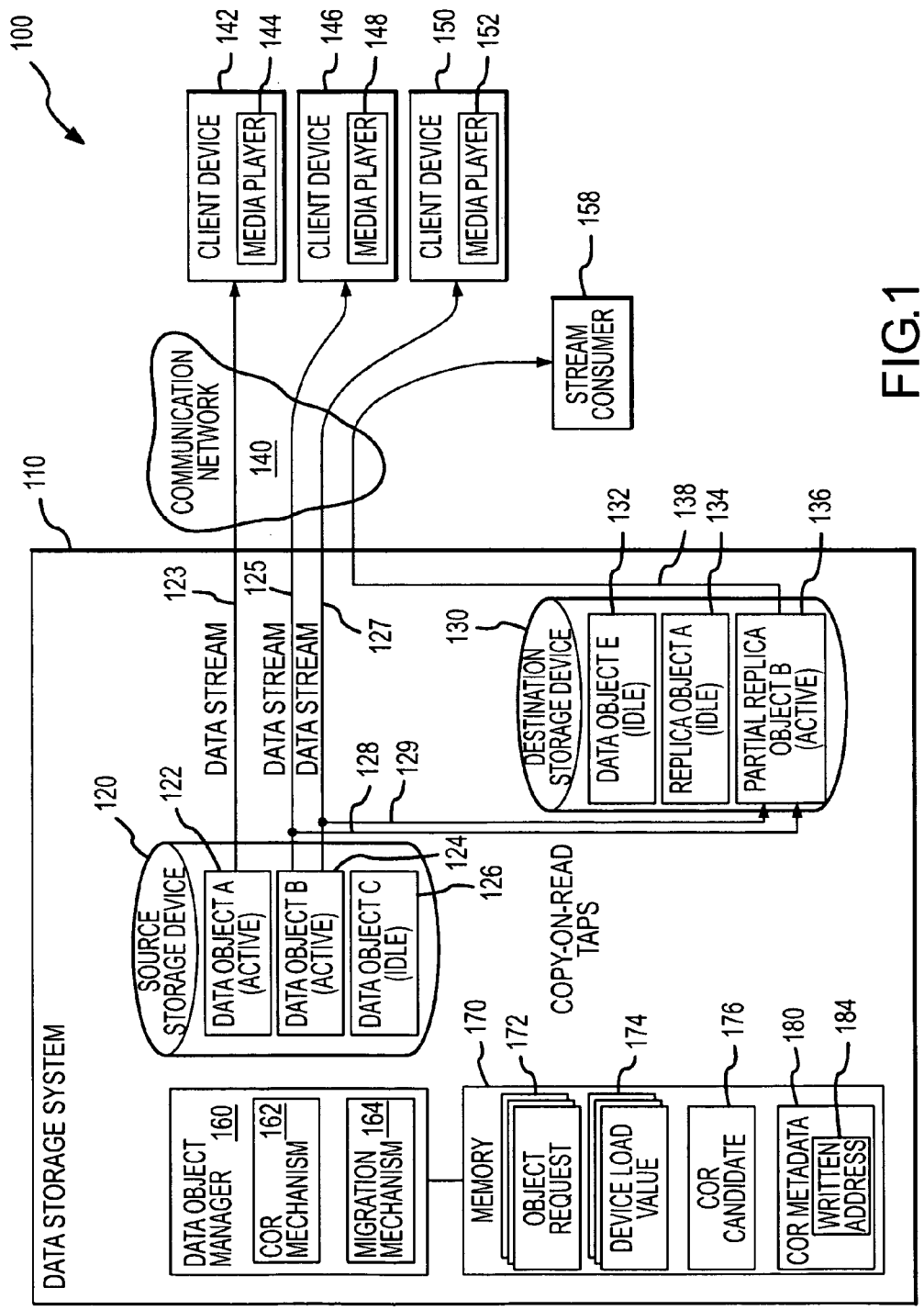
FIG. 1 illustrates in block form a streaming data storage and serving system according to one embodiment of the invention.

FIG. 1 illustrates a streaming data storage and serving system 100 according to one embodiment of the invention. In the following discussion, computer and network devices and storage devices, such as the software and hardware devices within the system 100 are described in relation to their function rather than as being limited to particular electronic devices and computer architectures and programming languages. To practice the invention, the computer and storage devices may be any devices useful for providing the described functions, including well-known data processing and communication devices and systems, such as application, database, web, and entry level servers, midframe, midrange, and high-end servers, personal computers and computing devices including mobile computing and electronic devices with processing, memory, and input/output components and running code or programs in any useful programming language, and server devices configured to maintain and then transmit digital data over a wired or wireless communications network. Data storage devices and memory are described herein generally and are intended to refer to nearly any device and media useful for storing digital data such as tape-based devices and disk-based devices, their controllers or control systems, and any associated software. Data, including transmissions to and from the elements of the system 100, typically is communicated in digital format following standard communication and transfer protocols, such as TCP/IP, FC, FC-AL, SCSI, PCI, HTTP, HTTPS, FTP, and the like, or IP or non-IP wireless communication protocols.

FIG. 1 illustrates an exemplary streaming data storage and serving system 100 that is configured or adapted to operate with the methods associated with the COPY-ON-READ approach of the present invention and explained in more detail with reference to FIGS. 2-6. The system 100 is a very simplified embodiment of a system that may be used to serve streaming data, such as movies, songs, and the like, to streaming data consumers or end users. In practice, of course, the system 100 may include any number of client devices or consumer devices, more than one network, and numerous data storage devices as well as data storage systems.

As shown, the system 100 includes a data storage system 110 serving data streams 123, 125, 127, 138 over a communications network 140 to client devices and stream consumers 142, 146, 150, and 158. The devices 142, 146, 150 include a media player 144, 148, 152 for processing the data streams 123, 125, 127 with stream consumer 158 being shown more generally as any device useful for requesting and consuming or using data in stream 138. The invention may be practiced with any media player 144, 148, 152 and device 142, 146, 150, 158 configuration with these components of system 100 being shown to indicate that the data storage system 110 is used to respond to varying demand for access to its data objects by taking steps including creating replicas using the COR approach and also managing load within the system 110 by migrating data streams and even by serving streams with partial replicas (as explained below).

The data storage system 110 would typically include one or more processors (not shown) for running applications, managing memory, and the like and include input/output devices (not shown) for user input, for displaying information, and for communicating with the network 140 and among the various components of the system 100. As shown, the data storage system 110 includes two storage devices 120, 130 for use in storing data objects used for serving streams of data to stream consumers, such as streams 123, 125, 127, 138. Typically, the devices 120, 130 would be configured to support serving a predetermined number of overall streams and a number of streams per data object. For ease of explanation, the storage device 120 is labeled a "source" while the storage device 130 is labeled a "destination" which indicates that the source storage device 120 includes a data object that is a COR candidate (i.e., a data object for which a replica is to be made) and that destination storage device 130 has been identified as being idle or at least less busy than the source device 120 such that it would be beneficial to create a replica or copy of the COR candidate on the destination device 130.

In this regard, the source storage device 120 is shown to include three data objects including a data objects 122, 124, 126. Data objects 122, 124 are shown to be serving data streams 123, 125, 127 and are, thus, labeled "active" while object 126 has no streams and is labeled as "idle." As will be explained in detail, the COR approach does not involve creating a new stream from a COR candidate but instead making use of existing streams to write data to a storage device to create a replica. With this in mind, the destination storage device 130 is shown to include an idle data object 132 differing from those objects of device 120, an idle full replica object 134 (i.e., a complete copy of object 122 of device 120), and an active partial replica object 136 (i.e., an incomplete copy of object 124 of device 120). The partial replica object 136 is being generated as part of a COR operation including using the data streams 125 and 127 being service from the data object 124 of device 120 to create COPY-ON-READ taps or write streams 128, 129. The object 136 is active with a stream 138 of data being served from the object 136 over network 140 to stream consumer 158 while the COR taps or write streams 128, 129 are used to concurrently (i.e., concurrent with each other and with the output stream 138) generate and complete the replica object 136 (i.e., data is provided to the replica 136 before it is needed or required for stream 138).

To control and manage the creation of replicas 134, 136 and other operations of the system 110, a data object manager 160 (e.g., a software application or the like) is included in the system 110. The data object manager 160 in turn may include components providing its functionality including a COR mechanism 162 for controlling the COR operation 162 and a migration mechanism 164 for controlling stream migrations in the system 110 (of course, these may be provided as a single component or further split into additional functional components). To facilitate the data object manager 160 completing its management of system 110 operations, memory 170 is provided for storing operational data include object requests 172 for streams from client devices 142, 146, 150, and/or 158, device load values 174 indicating a measured or determined load on the devices 120, 130 (e.g., a percentage or fraction of stream capacity), an identified COR candidate 176 among the data objects in the devices 120, 130 for application of the COR approach, and COR metadata 180 gathered during replication of an object including addresses that have been written 184 to an object, such as partial replica object 136 to allow accurate completion of the replica (such as upon an interruption).

Exemplary operation of the system 100 and, particularly, data object manager 160 according to embodiments of the invention can be readily explained through a description of the following phases or process: (a) triggering a COR operation upon detecting a nearly overloaded condition at a storage device; (b) selecting a data object at the overloaded device and streams from the data object to be tapped (or written from) or to be sent to a destination storage device during replication using the COR mechanism 162 and COR approach; (c) managing COR metadata 180 to keep track of the portions of the data object that have been written to the destination storage device (such as by storing written addresses 184 in memory 170); (d) responding to requests for additional streams; (e) migrating an existing stream to another storage device; (e) handling aborted streams; and (f) filling in any gaps in partial replicas, such as replica 136.

Figure 2:
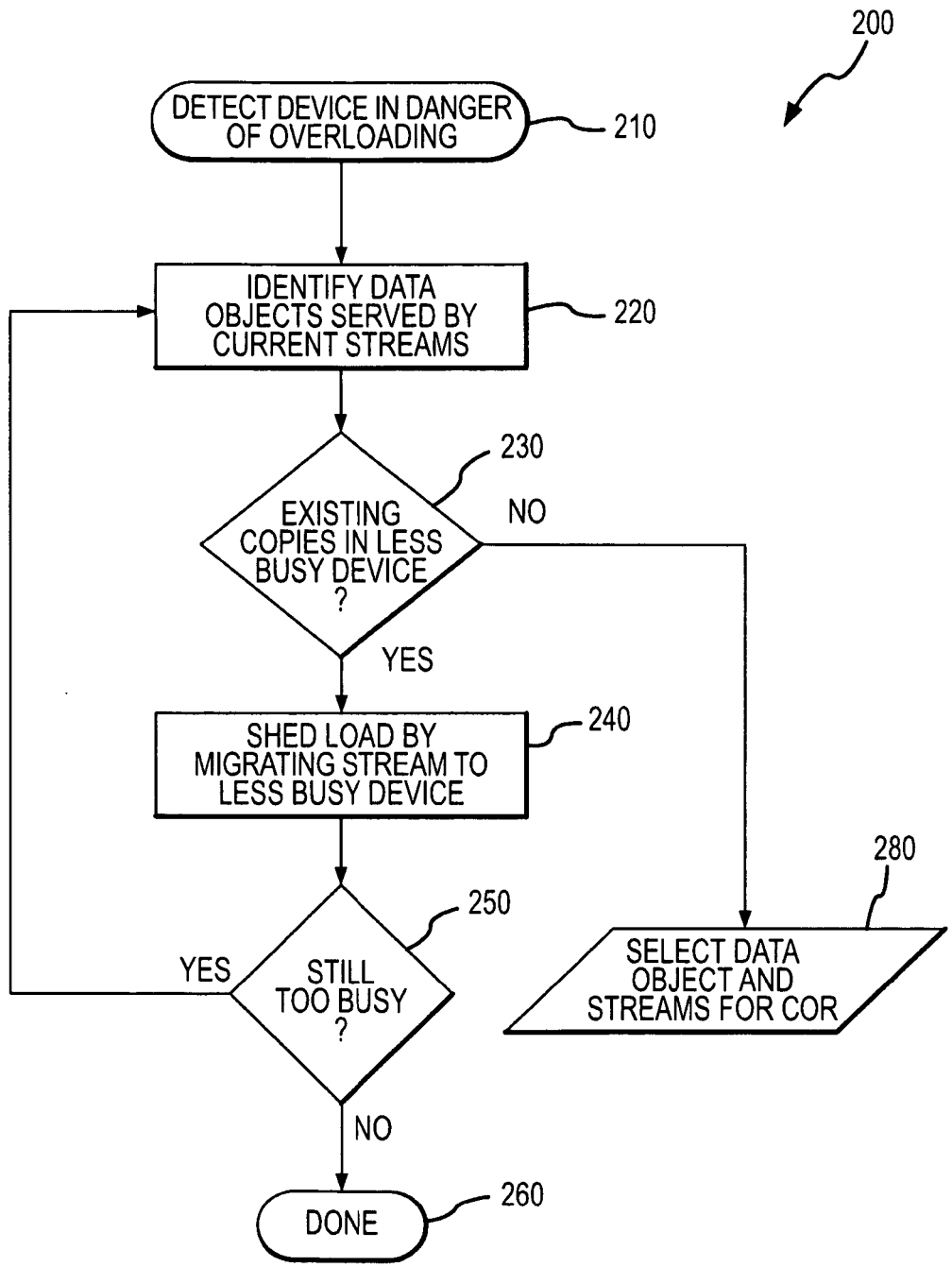
FIG. 2 illustrates a process for triggering a COPY-ON-READ (COR) operation such as may be performed during operation of the system of FIG. 1.

One function of the data object manager 160 is monitoring operation of the storage devices 120, 130 and to detect when an overload condition may exist and to initiate corrective actions including stream migration and/or initiating a COR operation. FIG. 2 illustrates a monitoring and management method 200 illustrating some of the functions performed by the data object manager 160 including triggering, or at least leading up to triggering, a COR operation. At 210, the data object manager 160 detects that a storage device, such as source storage device 120 is in danger of overloading. For example, but not as a limitation, the manager 160 may determine that the current number of streams (e.g., device load value 174 for device 120) being served by the source storage device 120 is at or above some predetermined threshold value, such as a percentage from 0.90 to near 100 percent (or within a range between the threshold value and a preset limit, such as between 95 and 99 percent capacity). Although not shown, the manager 160 may store the threshold and any maximum values for each device 120, 130 or for the system 110 in memory 170 for later use in this detection step 210.

At 230, the data object manager 160 identifies data objects 122 and 124 that are currently being served by the source storage device 120. In other words, the manager 160 determines which of the object are active in the near-overload storage device 120. At 230, the manager 160 determines if any of these active data objects 122, 124 are already existing or have existing copies or replicas on any other storage devices, such as storage device 130, in the system 110. So, with reference to the exemplary system 110 of FIG. 1, the manager 160 may determine that objects 122 and 124 are active in busy or source storage device 120 and that there already exists a replica or copy 134 of active data object 122. If replicas capable of handling stream requests exist (such as full or partial replicas), the method 200 (and its underlying system 100) attempts to shed load by migrating one or more of the streams on the objects in the source storage device 120 to a less busy device, such as the destination storage device 130 (as is described in detail below with reference to FIGS. 3-6). For now, it is sufficient to understand that during migration 240 the system 100 identifies the data objects associated with the streams currently being served up by the device ("active objects" at 220) and attempts to redirect one or more of these streams (such as stream 123 of data object 122 to replica object 134 in less busy storage device 130), whereby the streams can be delivered from a less busy device containing a copy or replica of the active object(s).

At 250, the method 200 continues with the data object manager 160 determining whether the source storage device 120 is still too busy, e.g., above a predetermined limit for stream serving or within a defined over capacity operating range. If not, the method 200 terminates at 260. If still too busy, the system 100 may repeat the operation including migration at 240 by returning to step 220 until the device 120 is no longer in danger of overload. If at 230, the system 100 (or data object manager 160) cannot identify a less busy device containing copies or replicas of the active objects to shed load through migration at 240, the system 100 selects at 280 a data object or objects for replication through the COR approach of the present invention and at this step 280 may select one or more streams from the selected active objects for use in the COR operation (as shown in FIG. 3).

Figure 3:
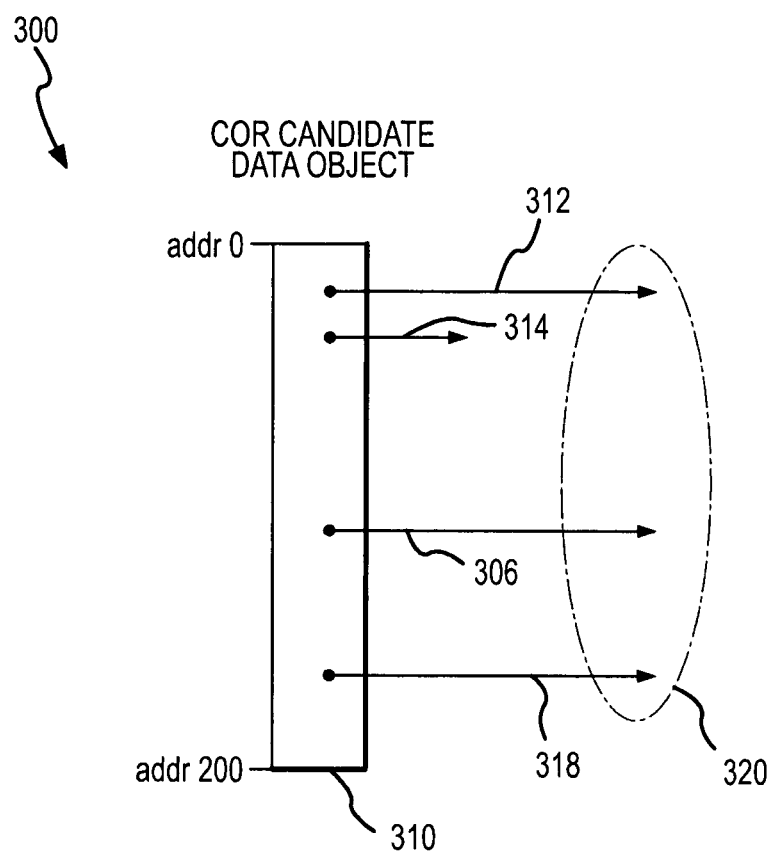
FIG. 3 illustrates in block form a selection of streams from a candidate data object for use in a COR operation showing the use of distributed stream addresses.

With reference to FIGS. 1 and 3, the COR approach of the present invention are described in more detail as may carried out at step 280. The data object manager 160, such as with the COR mechanism 162, acts to select among the active objects on the source storage device a data object that is currently serving the most number of streams (such as active data object 124 in FIG. 1). This data object is identified as the "COR candidate" that will be copied or replicated to an idle or otherwise less busy device (i.e., the "destination" storage device such as device 130) by way of a Copy-On-Read method performed by the COR mechanism 162. Depending on the bandwidth capability of the destination storage device 130, the COR mechanism 162 may send one or more streams associated with the COR candidate 124 to be written to (or "tapped off to") the destination storage device 130 in addition to continuing the normal delivery of these streams to their current end users. For example, with reference to FIG. 1, the COR mechanism 162 may tap off data streams 125, 127 from COR candidate 124 as shown with Copy-On-Read taps 128, 129 that are used to write to destination storage device 130 to create replica object 136 (shown as a partial replica during the replication process) while continuing to deliver data streams 125, 127 to client devices 146, 150.

As noted above, the COR candidate is typically selected by the COR mechanism 162 based on the number of streams it is serving. This selection criteria is used because the COR operation is capable of obtaining from multiple streams the data to be written to the destination storage device 130 to create the replica object 136. The data object in a busy device having the most or highest number of streams (which can be labeled "candidate streams") generally will yield a higher READ bandwidth so that a replica can be constructed in the destination device 130 in a shorter amount of time. In this manner, the COR operation can be performed so as to limit or even minimize the window of vulnerability to overloading and to increase or even maximize the opportunity to migrate a stream to be served by the newly created replica. In the description provided below, it will be described how such migration is possible even before a replica (such as replica 136) is completed, i.e., the COR operation and migration can occur concurrently in some cases.

In some embodiments of the invention, the selection of which streams to utilize in a COR operation is performed to assist in keeping track of what has been copied and to enhance efficiency of replica creation. After a COR candidate has been chosen, the COR mechanism 162 functions to select a number of streams (shown as "p" in FIG. 3) belonging to that data object to be tapped off to write to the destination storage device. The number, p, is selected in an attempt to saturate the WRITE bandwidth capability of the destination storage device (note, in some cases, the data object manager 160 may drop one or more of the COR taps or selected streams if the destination storage device becomes too busy due to other user demanded streams, i.e., output streams). From among the set of candidate streams (i.e., set of currently being served streams from the COR candidate), the COR mechanism 162 chooses a number, p, of streams such that the location they are currently accessing in the COR candidate are more evenly distributed over the valid address range of the COR candidate. This set of streams that will be tapped off to the destination storage device can be thought of as "COR streams."

As shown in FIG. 1, the COR mechanism 162 stores the COR candidate identification 176 in memory 170 and also stores and maintains a COR metadata structure 180 that records the address ranges 184 of the COR candidate fragments that have actually been written to the replica 136. As data is read from the COR candidate 124 by the COR streams 125, 127 with taps 128, 129, the COR mechanism 162 compares the address range being read against the already-written address ranges 184 in the COR metadata 180 and splits a copy of any yet un-written fragments to be written into the replica, updating the COR metadata 180 accordingly. Any fragments that have already been written are simply "skipped", i.e., are not written to the destination storage device 130 at this time. In either case, though, the COR streams 125, 127 continue to be delivered to the end users 146, 150.

FIG. 3 illustrates a portion of the COR operation 300 performed according to an embodiment of the invention, such as by operating COR mechanism 162. The effective bandwidth of the COR operation is improved and even maximized when such "skips" are limited or minimized. With this in mind, the COR mechanism 162 is preferably configured to select the COR streams from a COR candidate that have current addresses that are relatively evenly distributed over the valid address range of the COR candidate. For example, in the process 300 of FIG. 3, the COR candidate 310 has four candidate streams 312, 314, 316, and 318 that are currently being served to an end user (not shown). The valid address range is shown as ranging from 0 to 200. To select an even distribution, the number of candidate streams selected to be used as COR taps or COR streams is 3 (i.e., p=3) in this case to obtain an even distribution with streams 312, 316, 318 being chosen to make up the COR set or streams 320. These streams 320 are shown to be relatively evenly distributed. It would not be as desirable to select stream 312 and 314 for COR streams because the COR operation of replication will have just begun when stream 312 at address 15 would "catch up" with stream 314 currently at address 20, which would result in skipping of a large amount of addresses and a reduced effective COR bandwidth (would not use stream 312 for most of the operation).

Figure 4:
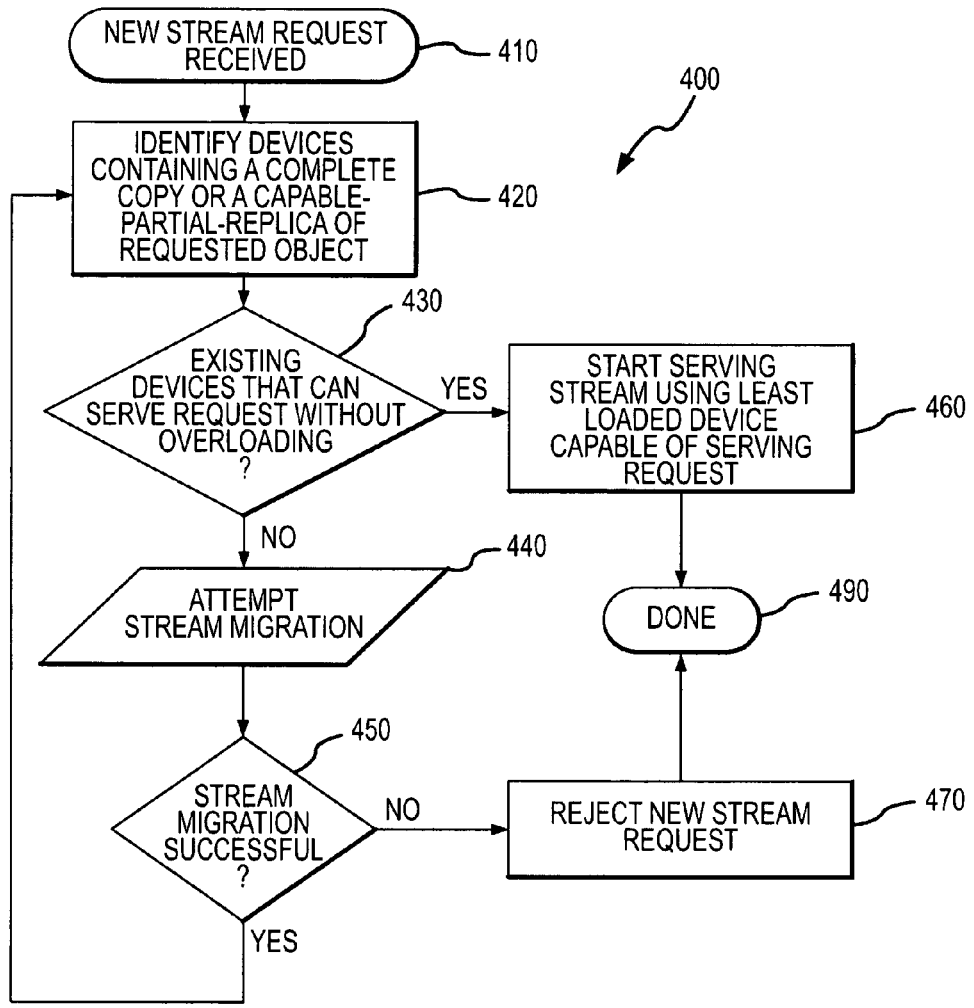
FIG. 4 illustrates an exemplary process for processing a received request for a data stream, such as may be performed during operation of the system of FIG. 1.

With an understanding of the general COR operation in hand, it may be useful now to describe stream migration techniques that can be utilized in conjunction with the COR operations to more effectively manage data stream delivery. FIG. 4 illustrates generally a stream management method 400 according to embodiment of the invention, such as may be carried out by operating the system 100 of FIG. 1. At 410, the data storage system 110 receives a request to start or serve a new stream. The data object manager 160 responds by identifying at 420 the storage devices 120 and/or 130 containing a complete copy of the requested data object. At 430, the data object manager 160 determines based on device loads 174 whether these devices can be thought of as "capable devices" that can serve up an additional stream without risking an overload condition. If capable devices do exist in the system 110, the data object manager 160 operates at 460 to start serving streams using the least loaded device capable of serving such stream requests. For example, as shown in FIG. 1, if a new stream request is received for data object "A", it would be determined that devices 120 and 130 have data objects 122, 138 and if not too busy or loaded, either device may be considered capable at 430 but at 460, storage device 130 may be used because of its lower load condition. The method 400 would terminate at 490.

If at 420 the data object manager 160 finds no complete copies of the requested object in capable devices 120, 130, the data object manager 160 attempts to locate any partial replicas of the requested data object in the system 110. A "partial replica" such as replica object 136 in device 130 is a data object that is in the process of being created within a COR destination storage device 130 as part of a COR operation carried out by COR mechanism 162. The data object manager 160 then attempts at 430 to identify any of the partial replicas that contain valid (i.e., already written) data for the starting address of the requested new stream (e.g., a new stream often will not start at address zero as the user or requester may want to start a stream, such as a movie or audio clip at another starting point) by matching the requested start address against entries 184 in the COR metadata 180.

If such capable partial replicas (such as replica object 136 in device 130) are found at 430, then the data object manager 160 starts serving the new stream (such as stream 138) using the least-loaded of such devices containing capable partial replicas (again, only if that can be done without causing these devices to overload). A capable partial replica object may be used to service the new stream because the partial replica object is concurrently getting the remaining data from the source object or COR candidate from at least one existing COR stream. This can be seen in FIG. 1 with the replica object 136 being created with COR taps 128, 129 from streams 125, 127 of COR candidate 124. Assuming all streams from data storage stream 110 have the same delivery rate, the data needed by the new stream (e.g., stream 138) should be available in the partial replica object because the COR streams 125, 127 that feed the partial replica 136 through taps 128, 129 continues to be ahead of the new stream (which was required to have started behind streams 125, 127 with the requirement that the starting address of the requested stream was already available in the partial replica object).

If the data object manager 160 is unable to start the new or requested stream using either an existing capable device or a partial replica without risking overload (i.e., an added stream will cause the device to exceed the predefined delivery limit or to enter the overload range), the data object manager 160 attempts stream migration at 440. The manager 160 goes through the list of capable devices attempting to migrate an existing stream off at least one of those devices without causing an overloaded condition in another device. If the manager 160 determines migration was successful at 450, the system 110 can start serving the new stream in place of the recently migrated stream. Note, the stream chosen to be migrated may be associated with any data object (e.g., may be the requested object corresponding to the new stream but this is not required) and the method 400 continues at 420. If no streams can be migrated to make room for the new stream, the data object manager 160 rejects the request for a new stream at 470 due to resource constraints and the method 400 ends at 490.

Figure 5:
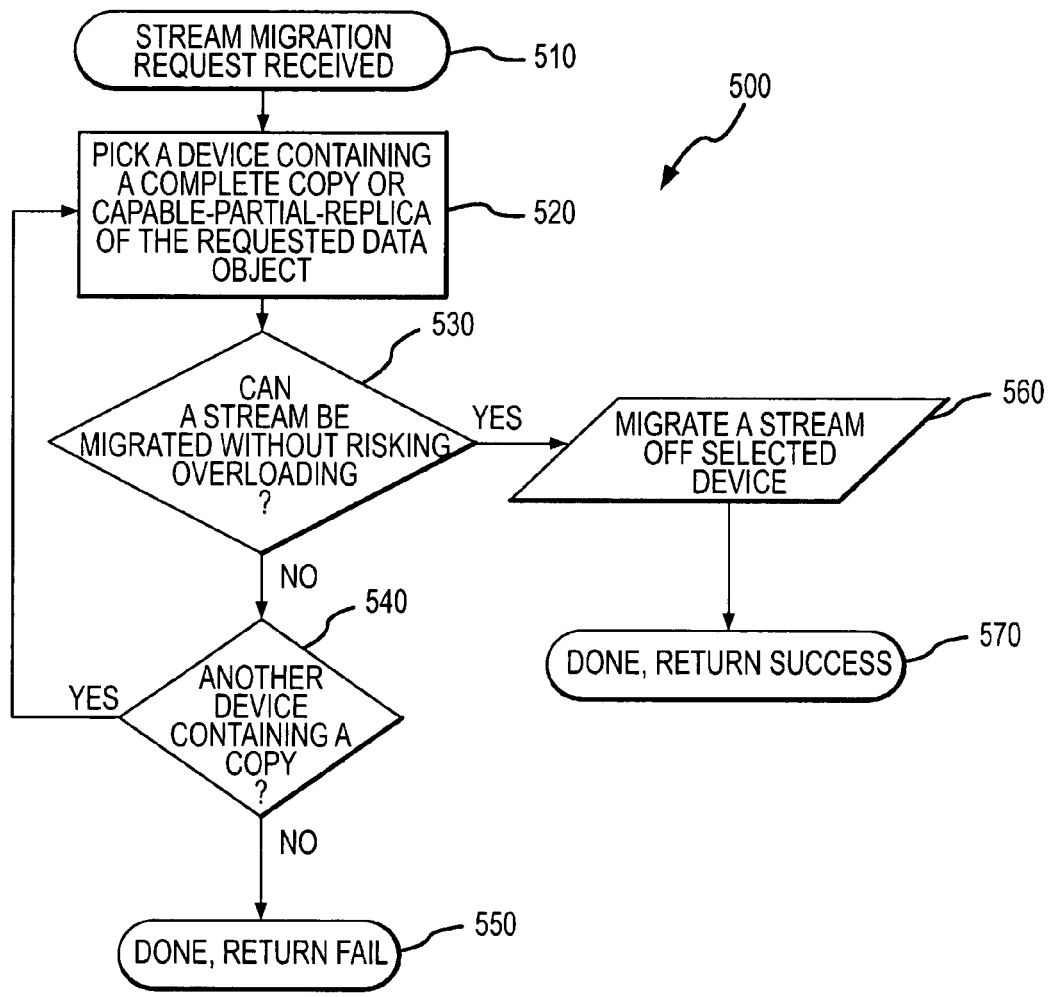
FIG. 5 illustrates an exemplary process for performing a stream migration according to an embodiment of the invention, such as may be performed during operation of the system of FIG. 1.

FIG. 5 illustrates an exemplary stream migration process 500 of the invention (such as may be performed during step 440 of method 400). At 510, the data object manager 160 may receive or more likely issue a migration request for a particular stream being served by the system 110. For example, at 440 of method 400, the manager 160 may issue a request for stream migration to a migration mechanism 164 to migrate a stream from one device 120, 130 to the other to reduce the load of the busier device. A stream is "migrated" when the system 110 stops serving the stream in or from the current storage device and has resumed serving the stream using another storage device. A stream migration is handled in a way similar to that of starting a new stream as discussed with reference to FIG. 4 except in order to limit the complexity a migration request preferably is handled in a manner that does not in turn trigger yet another migration. Hence, in the migration process 500 if a stream cannot be migrated to a capable device or a capable partial replica without causing overloading, the stream is not migrated.

At 520, the migration mechanism 164 acts to pick a storage device in the system 110 that contains a complete copy of or a capable partial replica of the data object corresponding to the stream indicated in the migration request. At 530, it is determined whether a stream can be migrated off the busy storage device without risking overloading the destination or target storage device. This is typically determined by comparing current device load values 174 with the addition of the proposed stream with predetermined overload limits or overload ranges for that storage device (as each device may differ in its load limits and capacities). If overloading is not a concern, a stream is migrated to the selected device, e.g., the least busy device among the available or non-overloaded storage devices in the system 110 with any acceptable tiebreaking method being implemented if more than one device are idle or have the same level of load.

In addition to choosing destination devices for migration, step 530 includes selection of a stream (if the request only request migration in general and does not specify a particular stream to migrate). In choosing a stream to be migrated in the system 110, any stream (that has a suitable device to migrate to) can be selected, including a COR stream or stream from which a replica is being created via the COR operation. In one embodiment, the following heuristics are used by the migration mechanism to select a stream for migration in a manner that improves resource utilization. Whenever possible, a stream is selected that can be migrated to idle or lightly-loaded devices so that the system load is more evenly distributed across the available storage devices. As a result, the migration mechanism 164 is able to reduce the probability of a migration being triggered by a subsequent new stream request. Also, when possible, a stream is selected such that after its migration, the total number of active objects in the system 110 is minimized.

For example, consider a first device that is currently serving the following: 5 streams of "Object X"; 1 stream of "Object Y"; and 3 streams of "Object Z". A second device is provided in the system that has an inactive Object X and an active Object Y that is serving 1 stream. A third device has three data objects including an inactive Object Z, an active Object X serving 3 streams, and an active "Object Q" serving 4 streams. It may be the goal of the migration mechanism 164 to migrate a stream off of the first storage device. In this case, it may be an appropriate choice to migrate the stream of Object Y to the second storage device such that after the migration the total number of active objects in the overall system is minimized. In other words, after the migration, the first device would have two active objects rather than the initial three, the second device would still only have one active object (Object Y) that would now serve 2 streams instead of 1 stream, and the third device would remain unchanged with two active objects. In contrast, if the migration mechanism 164 acted to migrate a stream from Object Z on the first storage device to the third storage device (which has an inactive Object Z), the total number of active data objects in the exemplary system would be increased from six to seven. Numerous other migrations are possible but the heuristics or decision path that is preferred for the migration mechanism 164 is that which produces the smallest number of active data objects in the system after the migration is completed with a closely related goal of migrating to a lightly loaded storage device (and in some cases, the migration mechanism 164 may choose a stream for migration that results in migration to the device with the lightest load but does not necessarily minimize the number of active data objects).

The migration mechanism 164 is configured to minimize the number of active data objects in the system 110 in some embodiments in order to achieve better or more consistent performance within the storage devices 120, 130. For example, the storage devices 120, 130 may be disk drives. In order to serve up a number of active objects, a disk drive repeatedly moves its read head from the data tracks containing one active object to another in some alternating manner so that it can retrieve the different pieces of data concurrently. Such read head movements incur some overhead and may make it more challenging for the disk drive to meet delivery rate guarantees. In another example, the storage devices 120, 130 may be RAID arrays with some fixed amount of internal cache memory which is shared among its active data objects. With fewer active data objects, each data object may be allocated a larger amount of the cache, making it easier to meet delivery rate guarantees by using, for example, a more aggressive prefetch strategy. Note, that if a COR stream were chosen to be migrated, the COR operation preferably continues using the newly-migrated stream and reading from the migration-target storage device as well as any other COR streams reading from the original device, e.g., the COR mechanism 162 is compatible in some embodiments to continue its COR operations during and after migration by the migration mechanism 164 including replacing its COR taps 128, 129 to a migrated stream that replaces a COR stream 125, 127.

In some embodiments of the invention, the COR approach is adapted for handling interruptions to the availability of COR streams, such as COR streams 125, 127 of FIG. 1. More particularly, if the consumer of a COR stream requests that the stream be stopped (or serving of the stream to their device 146, 150 be stopped), the data object manager 160 is configured for stopping delivery of the stream 125 or 127 to the user or client device 146 or 150 and also determines whether to continue or halt delivery of the stream 125 or 127 to the destination storage device 130 via the COR tap 128 or 129.

Figure 6:
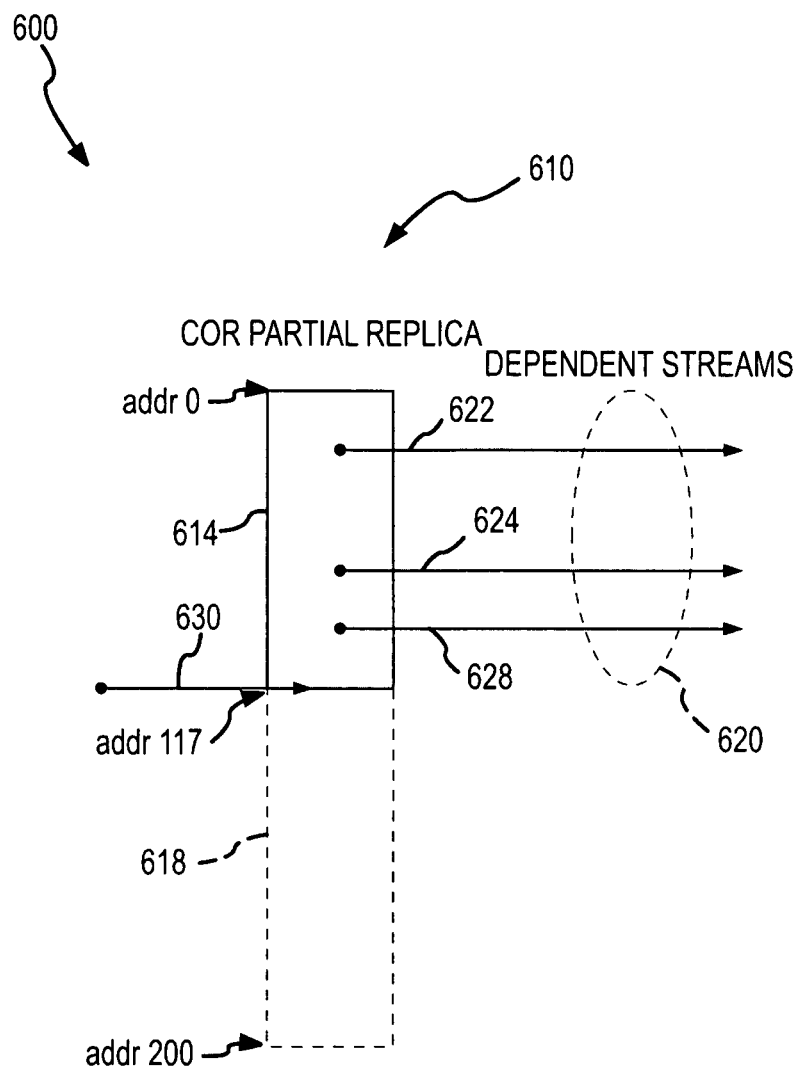
FIG. 6 illustrates in block form an interruption of an input stream for a COR operation which results, at least temporarily, in a partial replica of a data object.

FIG. 6 is useful for illustrating the process 600 performed by the manager 160 and/or the COR mechanism 162 upon receiving an interruption request. As shown, a COR partial replica 610 is being created by a COR method according to the invention and includes a written portion 614 (i.e., address 0 to address 117 in this example) and an incomplete or unwritten portion 618 (i.e., address 117 to address 200 in this example). The COR process is using COR stream or COR tap 630 to write or generate (or complete) the COR replica 610, which becomes the "interrupted COR stream" when stopped at address 117 (e.g., address 116 has been written in portion 614). In this example, the COR partial replica 610 is also currently being used to serve a set of streams or has a set of dependent streams 620 made up of streams 622, 624, and 628 that may be reading from differing addresses in the partial COR replica 610 (such as address 15, address 82, and address 95 or any other valid addresses in the partial replica 610, i.e., any address below address 117). For example, the partial replica 610 may be presently used by a storage device (such as device 130 of FIG. 1) to serve the data object being replicated by the replica 610 to three stream consumers (such as client devices 142, 146, 150, and/or 158).

The COR mechanism 162 (or manager 160) performs the following analysis in one embodiment to handle stream interruption requests. If the partial replica 610 being constructed by the interrupted COR stream 630 has exactly one dependent stream (i.e., a "dependent" stream is one that is reading from the written portion 614 of the replica 610), the COR mechanism 162 (or manager 160) determines that it is allowable to terminate the interrupted COR stream 630. The manager 160 then is operated (such as at a request from the COR mechanism 162) to initiate migration of the dependent stream to another data object and/or storage device that can take over serving the dependent stream to the stream consumer. However, in cases such as that illustrated in FIG. 6 where the partial replica 610 is serving more than one dependent streams (e.g., the set of dependent streams 620 has more than one stream as shown by streams 622, 624, and 628), the COR mechanism 162 and/or manager 160 preferably acts to select one of the dependent streams 622, 624, or 628 to be migrated to take its own place as described below. This technique leaves the others dependents to continue to read off the partial replica 610.

The dependent chosen to be migrated is typically the one whose READ address is most closely following the address being written by the interrupted COR stream. For example, as shown in the example of FIG. 6, dependent stream 628 which is reading address 95 would be chosen by the COR mechanism 162 or manager 160 for migration (and taking the place of the interrupted COR stream 630 which is writing at address 117) because it most closely follows interrupted COR stream 630. After dependent stream 628 has been migrated to another data object (not shown), it becomes a COR stream itself writing back into the same partial replica 610 while delivering data to its user (not shown), e.g., it is tapped for writing to the replica 610 as shown in FIG. 1 while still delivering a stream to a stream user. The use of this dependent stream selection criteria is used because it allows the remaining dependent streams 622, 624 to continue reading from the partial replica portion 614, with the new COR stream 628 continuing to supply any missing data fragments into the unwritten portion 618 of the replica 610 before they would be read by dependent streams 622, 624.

If the COR partial replica 610 had no dependent streams with a READ address that is prior to the WRITE address being written by the interrupted COR stream 630, then the COR mechanism 162 or manager 160 may be configured to simply terminate the interrupted COR stream 630 if current system load is relatively high or to make use of the freed up resources to complete the replica 610 in anticipation of future need, e.g., continue serving a stream from the source data source to the destination data source containing the partial replica 610 even though the stream is no longer serving a consumer.

In some operational situations, when the system 110 terminates a COR stream (such as interrupted COR stream 630 of FIG. 6), it may leave behind a partial replica that will not be completed. Also, depending on the current address of the selected COR streams when a COR operation is started, the beginning portion (address 0 onwards) of a partial replica may not in fact be fed by any of the COR streams. Such gaps in the data content of the partial replica can limit the usefulness of such partial replicas for serving up a new stream. In such cases, the COR mechanism 162 may be configured to run a background process to make use of idle system resources to fill the gaps (as determined by processing COR metadata 180 including the written addresses 184) for the partial replica.

With the above core functionalities of the system 100 understood, it may be useful now to discuss a few optional and/or additional functions that may be provided with the data object manager 160 of the invention. First, when a COR candidate has been selected, the manager 160 may choose (e.g., if the destination storage device has sufficient bandwidth) to pick the corresponding COR streams from more than one source storage devices (not shown in FIG. 1) containing a copy of the COR candidate data object rather than using a single source storage device. This technique may increase the effective READ bandwidth and may result in a shorter construction time to complete the replica if the destination storage device has enough WRITE bandwidth to cope.

Second, in some operating scenarios, the limitation discussed above that a migration operation would not be performed if it would result in another migration operation may be removed. In some embodiments of system 100, the data object manager 160 may be configured with additional load balancing functionality which allow one migration operation to trigger one or more additional migration operations, i.e., cascaded stream migration. For example, in a system, there may be a first storage device that has an Object X serving 0 streams, an Object Y serving 2 streams, and an Object Z serving 1 stream. A second storage device may only have an Object X that is idle and serving 0 streams. A third storage device may be provided that has an Object X that is active and serving 1 stream, an Object Z that is idle, and an Object W serving 1 stream. In this simple example, a load-balancing manager 160 may be adapted for cascaded migration. During operation, the stream being served by Object Z of the first device may be migrated to the Object Z in the third device, which would result in the third device at least temporarily being more heavily loaded. In turn, the manager 160 may act to migrate the stream being served by Object X of the third device to the second device to be served by its Object X. Such cascaded migration may provide an overall better distribution of the streams being served by the data objects and devices of the system. In some cases, the complexity would be limited by setting an upper limit on iterations or levels of such cascaded migration (e.g., cascaded migration allowed but not for more than 3 or 4 levels or some other defined number).

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed. Generally, implementations of the invention generate replicas dynamically to increase bandwidth available for serving up highly-demanded data objects, thereby avoiding wasting storage capacity for holding extra copies before the copies are needed as was the case with conventional systems. Replicas are constructed using data that is tapped off existing streams without further burdening already busy source storage devices (as opposed to explicit COPY operations). This allows the COR operation of the invention to be initiated when source devices are closer to 100 percent busy than conventional systems, which in some cases prevents additional copies from being made in the first place. An additional advantage of the invention is that the COR operation, by taking its data from multiple COR streams in some cases, provides a higher effective bandwidth when compared to a simple COPY command that uses a single stream, which results in a shorter replica construction time.

We claim:

1. A method of generating replicas or copies of data objects used to serve data streams from a data storage system having a plurality of storage devices, comprising:

determining one of the data storage devices is operating at a load above a predetermined overload value, wherein the determined data storage device operates to store one or more data objects and to serve one or more streams from the data objects to create the operating load;

identifying the data objects servicing the streams;

selecting one of the identified data objects to be replicated;

to create a replica, initiating writing data from the selected data object in a second one of the data storage devices using data from one or more of the streams served from the selected data object, wherein the one or more streams concurrently provide data to a stream consumer and to the replica;

after the initiating of the writing data to create the replica, receiving a request for a new stream from the selected data object; and serving the new stream from the replica concurrently with continued performance of the writing data to create the replica.

2. The method of claim 1, further comprising selecting two or more of the streams served from the selected data object for use in the writing, the selecting being performed such that current addresses being read by the selected streams from the selected one of the identified data objects are substantially distributed across valid addresses for the selected one of the identified data objects.

3. The method of claim 1, further comprising prior to the initiating of the copying, selecting the second one of the data storage devices from the storage devices by determining the second one is idle or is serving fewer streams than other ones of the data storage devices including the determined data storage device.

4. The method of claim 1, further comprising prior to the selecting one of the identified data objects and the initiating of the copying, identifying one of the data storage devices storing a copy of one of the identified data objects, migrating one of the streams from one of the identified data objects to the data storage device storing the copy, determining whether the operating load on the determined data storage device is above the predetermined overload value, and when the operating load is determined still above the predetermined overload value, performing the selecting one of the identified data objects for replication and the initiating of the copying.

5. The method of claim 4, wherein the stored copy is a partial replica and wherein the identifying of the copy comprises comparing a current write address for the partial replica and a current read address for the migrated one of the streams to verify that the current read address precedes the current write address.

6. The method of claim 1, further comprising after the initiating of the copying to create the replica and prior to completion of the replica, receiving from a user device a request for interruption of one of the streams being used in the copying and responding by terminating delivery of the interrupted one of the streams to the user device, identifying dependent streams being served from the replica, and initiating migration of one of the dependent streams to replace the interrupted one of the streams as a source of data in the copying, wherein the migrated one of the dependent streams is selected based on its read address proximity to a write address of the interrupted stream.

7. A computer readable medium, comprising:
computer readable program code devices configured to cause a computer to effect determining a data storage device is operating at a load above a predetermined overload value, wherein the data storage device operates to store one or more data objects and to serve one or more streams from the data objects to create the operating load;
computer readable program code devices configured to cause the computer to effect identifying the data objects being served by the streams;
computer readable program code devices configured to cause a computer to effect selecting one of the identified data objects to be replicated;
computer readable program code devices configured to cause a computer to effect creation of a replica by writing data from the selected data object in a second one of the data storage devices using one or more of the streams served from the selected data object, wherein the one or more streams concurrently provide data to a stream consumer and
computer readable program code devices configured to cause the computer to effect after the initiating of the copying to create the replica, receiving a request for a new stream from the selected data object and serving the new stream from the replica concurrently with continued performance of the writing.

8. The computer readable medium of claim 7, further comprising computer readable program code devices configured to cause the computer to effect selecting two or more of the streams served from the selected data object for use in the copying, the selecting being performed such that current addresses being read by the selected streams from the selected one of the identified data objects are substantially distributed across valid addresses for the selected one of the identified data objects.

9. The computer readable medium of claim 7, further comprising computer readable program code devices configured to cause the computer to effect prior to the initiating of the copying, selecting the second one of the data storage devices from the storage devices by determining the second one is idle or is serving fewer streams than other ones of the data storage devices including the determined data storage device.

10. The computer readable medium of claim 7, further comprising computer readable program code devices configured to cause the computer to effect prior to the selecting one of the identified data objects and the initiating of the copying, identifying one of the data storage devices storing a copy of one of the identified data objects, migrating one of the streams from one of the identified data objects to the data storage device storing the copy, determining whether the operating load on the determined data storage device is above the predetermined overload value, and when the operating load is determined still above the predetermined overload value, performing the selecting one of the identified data objects for replication and the initiating of the copying.

11. The computer readable medium of claim 10, wherein the stored copy is a partial replica and wherein the identifying of the copy comprises comparing a current write address for the partial replica and a current read address for the migrated one of the streams to verify that the current read address precedes the current write address.

12. A data object replication method, comprising:
serving a plurality of data streams from a data object stored on a source storage device;
selecting a set of two or more of the data streams for use in creating a replica of the data object;
identifying a destination storage device having a stream load less than the source storage device;
writing data from each of the data streams in the selected set to the destination storage device to generate a replica of the data object in the source storage device, wherein the writing of the data to the source storage device and the serving of the plurality of data streams are performed concurrently; and
after the initiating of the writing data from each of the data streams, receiving a request for a new stream from the data object; and
serving the new stream from the replica concurrently with continued performance of the writing data from each of the data streams.

13. The method of claim 12, wherein write addresses in the replica used during the writing are equivalent to read addresses of the data streams in the selected set being served from the data object in the serving of the plurality of data streams.

14. The method of claim 13, further comprising serving a data stream from the replica during the writing of the data, wherein the data stream from the replica has a read address less than at least one of the data streams in the selected set being served from the source storage device.

15. The method of claim 12, wherein the selecting of the set of data streams comprises determining a reading address of each of the plurality of data streams and discarding one of the plurality of data streams for which the reading address is greater than a following one of the plurality of data streams by less than a predetermined distribution value.

16. The method of claim 12, further comprising during the writing of the data from each of the data streams, storing metadata in memory including addresses of the data object written to the replica.

17. The method of claim 16, further comprising interrupting the writing of the data and after the interrupting, determining from the stored metadata ranges of addresses not written to the replica and copying data to the ranges of the unwritten addresses to compete the replica.

* * * * *